(12) United States Patent
Biskeborn et al.

(10) Patent No.: US 8,240,024 B2
(45) Date of Patent: Aug. 14, 2012

(54) METHODS FOR FABRICATING MAGNETIC TRANSDUCERS USING POST-DEPOSITION TILTING

(75) Inventors: Robert Glenn Biskeborn, San Jose, CA (US); Laurent Dellmann, Rüschlikon (CH); Michel Despont, Postfach (CH); Philipp Herget, San Jose, CA (US); Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 12/547,224

(22) Filed: Aug. 25, 2009

(65) Prior Publication Data

US 2011/0047785 A1 Mar. 3, 2011

(51) Int. Cl.
 *G11B 5/127* (2006.01)
 *H04R 31/00* (2006.01)

(52) U.S. Cl. .............. 29/603.13; 29/603.11; 29/603.14; 29/603.15; 29/603.16; 216/22; 216/29; 216/41; 216/48; 216/65; 360/121; 360/122; 360/317

(58) Field of Classification Search .............. 29/603.11, 29/603.13–603.16, 603.18; 216/22, 39, 41, 216/48, 65; 360/121, 122, 317; 451/5, 41
See application file for complete search history.

(56) References Cited

U.S. PATENT DOCUMENTS

| | | | |
|---|---|---|---|
| 3,846,841 A | 11/1974 | Lazzari et al. | 360/121 |
| 4,233,637 A | 11/1980 | Kubota | 360/10 |
| 4,451,862 A | 5/1984 | Rijckaert et al. | 360/109 |
| 4,855,854 A | 8/1989 | Wada et al. | 360/126 |
| 4,949,207 A | 8/1990 | Lazzari | 360/119 |
| 5,067,230 A | 11/1991 | Meunier et al. | 29/603 |
| 5,283,942 A | 2/1994 | Chen et al. | 29/603 |
| 5,757,589 A | 5/1998 | Kang | 360/109 |
| 5,910,869 A | 6/1999 | Fedeli | 360/113 |
| 5,926,348 A | 7/1999 | Shouji et al. | 360/113 |
| 6,122,445 A * | 9/2000 | Yamada | 396/2 |
| 6,198,607 B1 | 3/2001 | Cain et al. | 360/318.1 |
| 6,289,564 B1 | 9/2001 | Novotny | 29/25.35 |
| 6,381,104 B1 | 4/2002 | Soeno et al. | 360/294.4 |
| 6,473,273 B1 | 10/2002 | Kikuiri | 360/271.5 |
| 6,477,018 B1 | 11/2002 | Terunuma | 360/317 |
| 6,493,191 B1 | 12/2002 | Cain et al. | 360/246.2 |
| 6,650,496 B2 | 11/2003 | Nozieres et al. | 360/63 |

(Continued)

FOREIGN PATENT DOCUMENTS

EP 1 748 283 7/2006

(Continued)

OTHER PUBLICATIONS

U.S. Appl. No. 12/614,275, filed Nov. 6, 2009.

(Continued)

*Primary Examiner* — Paul D Kim
(74) *Attorney, Agent, or Firm* — Zilka-Kotab, PC (57) ABSTRACT

In one general embodiment, a method for fabricating magnetic structures using post-deposition tilting includes forming a thin film magnetic transducer structure on a substantially planar portion of a substrate such that a plane of deposition of the thin film transducer structure is substantially parallel to a plane of the substrate. Additionally, the thin film transducer structure is caused to tilt at an angle relative to the plane of the substrate. The thin film transducer is fixed at the angle after being tilted.

16 Claims, 6 Drawing Sheets

U.S. PATENT DOCUMENTS

| | | | | |
|---|---|---|---|---|
| 6,687,977 | B2 | 2/2004 | Knapp et al. | 29/603.15 |
| 6,785,096 | B2 | 8/2004 | Kuwajima et al. | 360/294.4 |
| 6,842,313 | B1 | 1/2005 | Mallary | 360/319 |
| 6,895,657 | B2 | 5/2005 | Mishima et al. | 29/603.07 |
| 6,943,990 | B1 | 9/2005 | Yokoyama et al. | 360/294.4 |
| 7,064,933 | B2 | 6/2006 | Macken et al. | 360/294.7 |
| 7,100,266 | B2 | 9/2006 | Plumer et al. | 29/603.14 |
| 7,126,330 | B2 | 10/2006 | Peczalski et al. | 324/247 |
| 7,130,159 | B2 | 10/2006 | Shimizu et al. | 360/294.4 |
| 7,151,650 | B2 | 12/2006 | Lee | 360/294.7 |
| 7,170,718 | B2 | 1/2007 | Sakamoto et al. | 360/264.2 |
| 7,779,535 | B2 * | 8/2010 | Kanaya et al. | 29/603.16 |
| 2003/0208901 | A1 | 11/2003 | Lim et al. | 29/603.12 |
| 2005/0235483 | A1 | 10/2005 | Biskeborn et al. | 29/603.01 |
| 2005/0264944 | A1 | 12/2005 | Fontana, Jr. et al. | 360/313 |
| 2006/0171081 | A1 | 8/2006 | Brcuer et al. | 360/313 |
| 2006/0176142 | A1 | 8/2006 | Naito et al. | 338/32 |
| 2006/0256471 | A1 | 11/2006 | Plumer et al. | 360/122 |
| 2007/0047143 | A1 * | 3/2007 | Matsumoto | 360/234.3 |

FOREIGN PATENT DOCUMENTS

| | | |
|---|---|---|
| JP | 57208621 | 12/1985 |

OTHER PUBLICATIONS

Chapman, et al., "A New Horizontal MR Head Structure", IEEE Transactions on Magnetics. vol. 25, No. 5, Sep. 1989, pp. 3689-3691.

Ho, et al., "Study of Longitudinal Stabilization Using In-Stack Biasing", IEEE Transactions on Magnetics, vol. 40, No. 1, Jan. 2004, pp. 189-194.

Lamberton, et al., "Current-in-Plane GMR Trilayer Head Design for Hard-Disk Drives: Characterization and Extendibility", IEEE Transactions on Magnetics, vol. 43, No. 2, Feb. 2007, pp. 645-650.

Lazzari, "Planar Silicon Heads/Conventional Thin Film Heads Recording Behavior Comparisons" IEEE Transactions on Magnetics. vol. 32, No. 1, Jan. 1996, pp. 80-83.

Nozieres, et al., "Planar GMR Head Design for 50+ Gbit/in2 Recording", Journal of Magnetism and Magnetic Materials, 242-245(2002)341-344.

Tamakawa, et al., "Multichannel Write and GMR Heads for Over I TB Tape System", IEEE Transactions on Magnetics, vol. 42, No. 10, Oct. 2006, pp. 2324-2326.

U.S. Appl. No. 12/547,246, filed Aug. 25, 2009.

Church, MA, and Decker, SK, "Integrated Magnetoresistive Read Inductive Write Film Magnetic Head Assembly" 2009-2011 IP.com, Feb. 8, 2005, IBM TDB 12-83 p. 3366-3367 (abstract only).

Restriction Requirement from U.S. Appl. No. 12/547,246 dated Oct. 11, 2011.

Church, MA, and Decker, SK, "Integrated Magnetoresistive Read Inductive Write Film Magnetic Head Assembly" 2009-2011 IP.com, Feb. 8, 2005, IBM TDB 12-83 p. 3366-3367, p. 1-3.

Non-Final Office Action from U.S. Appl. No. 12/547,246 dated Jan. 24, 2012.

Notice of Allowance and Fee(s) Due from U.S. Appl. No. 12/614,275 dated May 17, 2012.

Final Office Action Summary from U.S. Appl. No. 12/547,246 dated May 30, 2012.

* cited by examiner

METHODS FOR FABRICATING MAGNETIC TRANSDUCERS USING POST-DEPOSITION TILTING

FIELD OF THE INVENTION

The present invention relates to thin film processing, and more particularly, this invention relates to methods for fabricating magnetic structures using post-deposition tilting.

BACKGROUND OF THE INVENTION

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

SUMMARY OF THE INVENTION

In one general embodiment, a method is provided for fabricating magnetic transducers using post-deposition tilting. A thin film magnetic transducer structure is formed on a substantially planar portion of a substrate such that a plane of deposition of the thin film transducer structure is substantially parallel to a plane of the substrate. Additionally, the thin film transducer structure is caused to tilt at an angle relative to the plane of the substrate. The thin film transducer is fixed at the angle after being tilted.

In another general embodiment, a method is provided for fabricating magnetic transducers using post-deposition tilting. A thin film magnetic transducer structure is formed on a substantially planar portion of a substrate such that a plane of deposition of the thin film transducer structure is substantially parallel to a plane of the substrate. Additionally, a sacrificial portion of the substrate is removed for causing the thin film transducer structure to tilt at an angle relative to the plane of the substrate.

In yet another general embodiment, a method is provided for fabricating transducers using post-deposition tilting. A magnetic transducer is formed on a substantially planar potion of a substrate such that a plane of deposition of the magnetic transducer is substantially parallel to a plane of the substrate. The magnetic transducer is caused to tilt at a predetermined angle relative to the plane of the substrate.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises. etc.

The following description discloses several preferred embodiments of magnetic systems, as well as operation and/or component parts thereof.

In one general embodiment, a method is provided for fabricating magnetic transducers using post-deposition tilting. A thin film magnetic transducer structure is formed on a substantially planar portion of a substrate such that a plane of deposition of the thin film transducer structure is substantially parallel to a plane of the substrate. Additionally, the thin film transducer structure is caused to tilt at an angle relative to the plane of the substrate. Furthermore, after causing the thin film transducer structure to tilt, the thin film transducer structure may optionally be fixed in place on the substrate at the angle.

In another general embodiment, a method is provided for fabricating magnetic transducers using post-deposition tilting. A thin film magnetic transducer structure is formed on a substantially planar portion of a substrate such that a plane of deposition of the thin film transducer structure is substantially parallel to a plane of the substrate. Additionally, a sacrificial portion of the substrate is removed for causing the thin film transducer structure to tilt at an angle relative to the plane of the substrate.

In yet another general embodiment, a method is provided for fabricating magnetic transducers using post-deposition tilting. A magnetic transducer is formed on a substantially planar potion of a substrate such that a plane of deposition of the magnetic transducer is substantially parallel to a plane of the substrate. The magnetic transducer is caused to tilt at a predetermined angle relative to the plane of the substrate.

In one general embodiment, tilting is achieved by patterning and releasing a MEMS structure. The structure is attached to the substrate by two arms which allow the transducer to rotate.

In another general embodiment, a slope is created in the substrate below the transducer and the transducer is tilted onto this slope. In this embodiment, capillary action may be used to apply the force which tilts the transducer onto this slope.

In yet another general embodiment, a cantilever is created by removing a sacrificial layer placed below the transducer during its fabrication. In this embodiment, tilting can be achieved by incorporating a stresses into the layers that later become the cantilever. As the cantilever is released, these stresses act to bend the cantilever and tilt the transducer.

Figure 1:
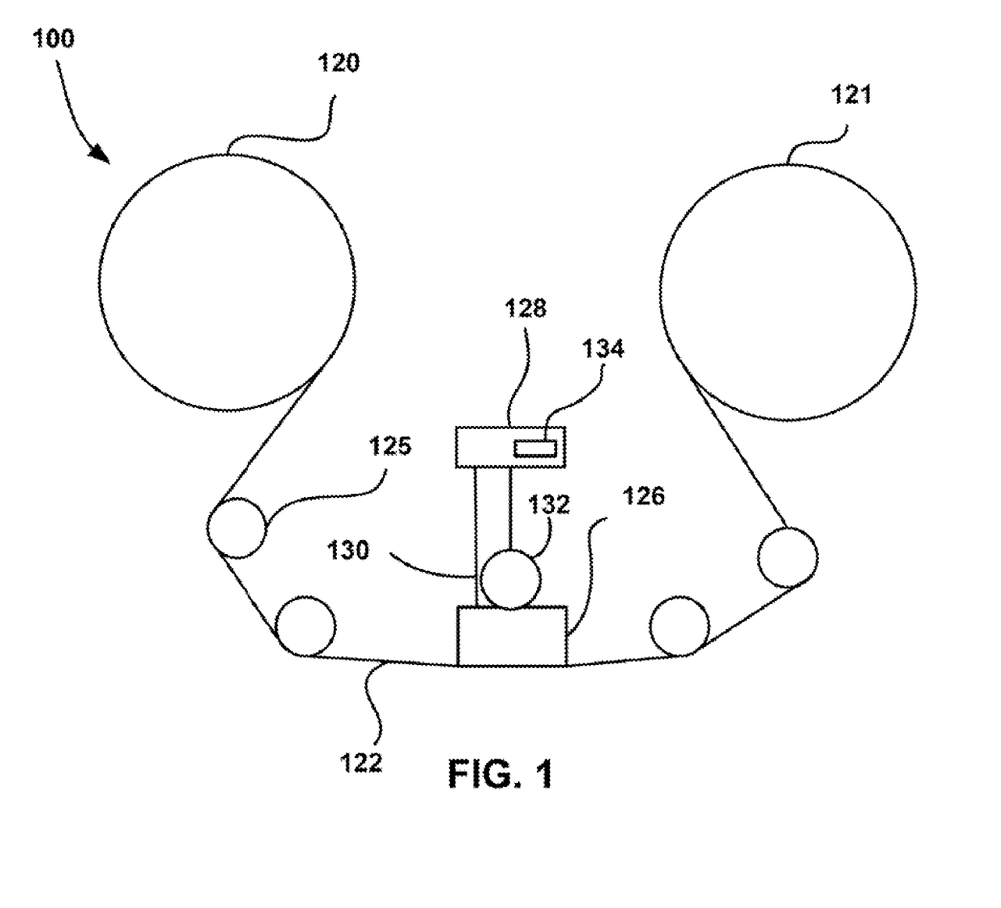
FIG. 1 is a schematic diagram of a simplified tape drive system according to one embodiment.

FIG. 1 illustrates a simplified tape drive 100 of a tape-based data storage system which may be employed in the context of the present invention. While one specific implementation of a tape drive is shown in FIG. 1, it should be noted that the embodiments described herein may be implemented in the context of any type of magnetic recording system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
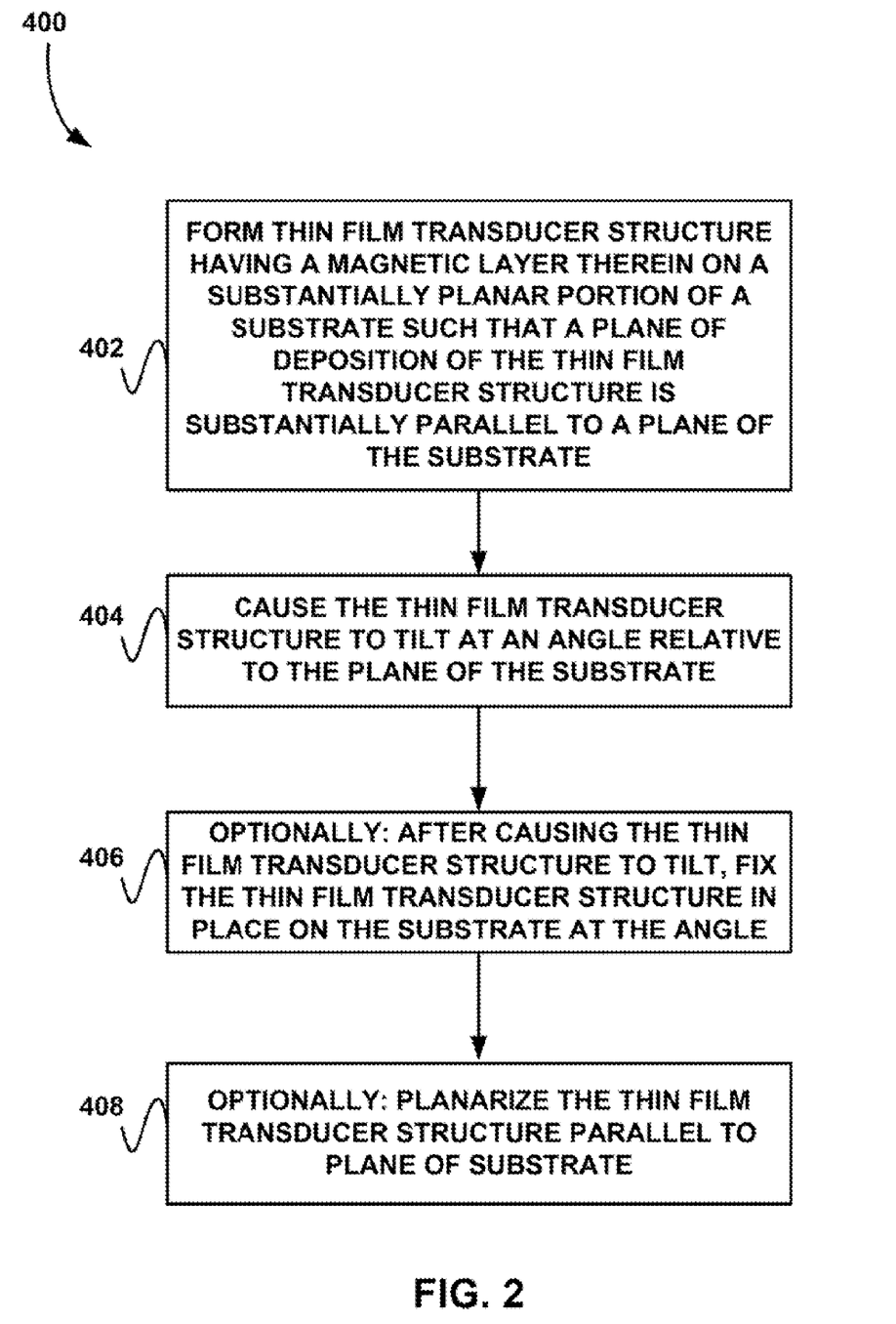
FIG. 2 shows a method for fabricating magnetic transducers using post-deposition tilting, in accordance with one embodiment.

FIG. 2 shows a method 400 for fabricating magnetic transducers using post-deposition tilting, in accordance with one embodiment. As an option, the present method 400 may be implemented to construct structures to be used for the read write transducer in tape drives such as the one shown in FIG. 1. Of course, however, this method 400 and others presented herein may be used to form magnetic structures for a wide variety of devices and/or purposes which may or may not be related to magnetic recording. Further, the methods presented herein may be carried out in any desired environment. It should also be noted that the aforementioned definitions may apply during the present description.

As shown, a thin film magnetic transducer structure is formed on a substantially planar portion of a substrate such that a plane of deposition of the thin film transducer structure is substantially parallel to a plane of the substrate. See operation 402. Note that typically, a transducer will include multiple thin film layers, which may include one or more magnetic layers. It should also be noted that the thin film transducer structure may be formed using any conventional processes that are well known to those skilled in the art. Moreover, the thin film transducer structure may be of any conventional or future construction.

As an option the thin film transducer structure may be a magnetic sensor (reader). As another option, the thin film transducer structure may be a magnetic writer. Furthermore, the substrate may be formed of any acceptable material. For example, in one embodiment, the substrate may be comprised of silicon.

As shown further, the thin film transducer structure is caused to tilt at an angle relative to the plane of the substrate. See operation 404. For example, in a writer, the angle of the plane of deposition of the write gap, with respect to the plane of the substrate, will generally change with the tilting to somewhere from greater than 0 degrees up to 90 degrees, e.g., from about 10 to about 90 degrees, from about 45 to about 90 degrees, from about 30 degrees to about 60 degrees, etc.

Causing the thin film transducer structure to tilt may be accomplished using a variety of techniques. For example, in one embodiment, capillary action may operatively cause the thin film transducer structure to tilt at the angle. In another embodiment, removing a sacrificial portion of the substrate may cause another portion of the substrate to form a cantilever supporting the thin film transducer structure, and a local stress may operatively cause the cantilever to bend, thereby causing the thin film transducer structure to tilt at the angle. In still another embodiment, removing the portion of the substrate may allow built-in stresses to cause the thin film transducer structure to tilt at the angle. In still another embodiment an external force may be applied to tilt the sensor, for example using a magnetic field.

As an option, an axis of the tilting is about parallel to the plane of the substrate. As another option, an axis of the tilting may be about parallel to the plane of the substrate and about perpendicular to an expected direction of media travel relative to the magnetic sensor.

After causing the thin film transducer structure to tilt, the thin film transducer structure is preferably fixed in place on the substrate at the angle. See optional operation 406. In some approaches, operation 406 may be omitted. For example, the tilted thin film transducer structure may tilt such that the thin film transducer structure need not be fixed in place. This my occur for example, if film stresses cause a cantilever to be pushed against a stop with enough force to prevent further movement. More detail about how the tilt angle is controlled is presented below.

In further approaches, the tilted structure may be self-fixing, e.g., by a pre-applied adhesive, by naturally-occurring attractive forces with an underlying layer, etc.

In yet other approaches, a protective layer may be added to the tilted structure, which may have the effect of fixing the tilted structure in place.

It should be noted that the thin film transducer structure may be tilted at any desirable angle depending on a particular application and/or system. For example, in one embodiment, the thin film transducer structure may be tilted such that the plane of deposition thereof is oriented at an angle of greater than about 1 degree from the plane of the substrate, where the plane of the substrate is typically parallel to the flat upper surface of the substrate upon which the various layers are deposited. In various other embodiments, the thin film transducer structure may be tilted such that the plane of deposition thereof is oriented at an angle of greater than about 2 degrees, greater than about 5 degrees, greater than about 15 degrees, greater than about 30 degrees, greater than about 45 degrees, greater than about 60 degrees, greater than about 80 degrees, etc.

As an option, the method 400 may further include planarizing the thin film transducer structure along a plane substantially parallel to the plane of the substrate. See operation 408. This planarization may define the media-facing surface of the thin film structure. In one embodiment, the thin film transducer structure may be formed on a rigid platform that tilts with the thin film transducer structure. In this case, the rigid platform may be utilized to reduce exertion of stresses on the thin film transducer structure. Strictly as an option, the substrate may include the platform.

In various other embodiments, the substrate may include any other item or component under the thin film transducer structure. In one embodiment, the method 400 may further include removing a sacrificial portion of the substrate for creating a pivot point about which the thin film transducer structure pivots.

While the pivot point may be centered relative to the thin film transducer structure, in a particularly preferred approach, the pivot point is under and off-center from the thin film transducer structure. As another option, the pivot point may be spaced apart from the thin film transducer structure such that the thin film transducer structure pivots along an arc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
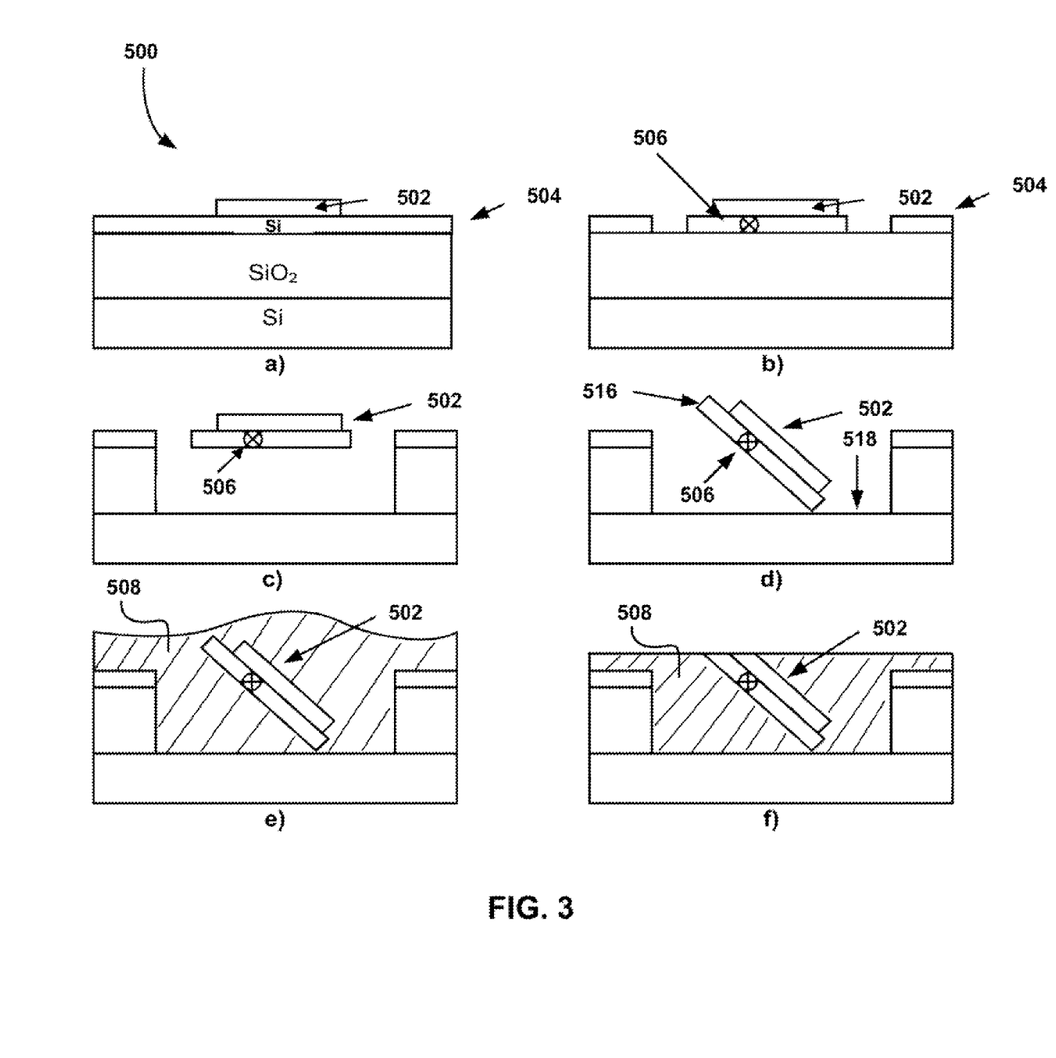
FIG. 3 shows a method for fabricating a magnetic transducer using post-deposition tilting, in accordance with another embodiment.

FIG. 3 shows a method 500 for fabricating a magnetic transducer using post-deposition tilting, in accordance with another embodiment. FIGS. 3a-f show the side view (cut though the wafer) at various stages of the fabrication process. FIG. 3g shows a top view of the structure just before releasing and tilting, corresponding to FIG. 3b. As shown, Microelectromechanical structures (MEMS) are used to rotate a magnetic transducer, in this example a sensor 502. First, a sensor 502 is deposited onto a silicon on insulator (SOI) wafer 504 as shown in FIG. 3a. Next, the wafer 504 is patterned such that the sensor 502 may rotate about the pivot point 506 when released (FIG. 3b). This pivot point 506 denotes the center of rotation of the structure.

Once released (FIG. 3c), the sensor 502 is rotated about the pivot point 506 (FIG. 5d) and material is applied thereto to lock it in place (FIG. 3e). Any suitable method for rotation may be employed. In one embodiment, rotating a structure including the sensor 502 may be accomplished by providing an external macroscopic field to exert a force on the magnetic material in the sensor 502. In another embodiment, the rotation may be accomplished by incorporating built in stresses in the MEMS structure to produce a structure that will rotate once released. In a further embodiment, the sensor 502 may be mechanically rotated.

The structure may also contain mechanisms to control the angle of the sensor during the tilting process. With continued reference to FIG. 3d, it is seen that the platform 516 upon which the sensor 502 is formed abuts the bottom 518 of the channel formed by removing the $SiO_2$. This has the effect of defining the degree of rotation of the sensor. Accordingly, the tilt angle of the sensor 502 can be carefully and reproducibly controlled by selecting the appropriate pivot point position, platform dimensions and/or channel depth.

Additionally, as shown in FIG. 3e, the sensor 502 may be fixed into place by adding a material 508 to the magnetic transducer. Such material may include any material capable of fixing the sensor 502. Illustrative materials include spin on coatings (e.g., polymers), vapor-deposited materials, etc. In the final step, the wafer is polished to adjust the height of the magnetic transducer (FIG. 3f). In various embodiments, such polishing may include chemical mechanical polishing (CMP), reactive ion etching (RIE), and/or any other various polishing techniques.

FIG. 3g shows a top-down view of a magnetic transducer during fabrication using method 500. As shown, arms 512 are provided such that the sensor 502 may be rotated about the pivot point. Additionally as shown, leads 514 may be routed using a path defined by the arms 512.

Note that the arms 512 need not be straight as shown in FIG. 3g, but rather may take any desired shape or be any structure that will provide the required rotation. For instance, one or more of the arms may follow a tortuous path that provides the required stiffness and rotation point. Any suitable MEMS structures which provide rotation that are known to those skilled in the art may be used.

Figure 4:
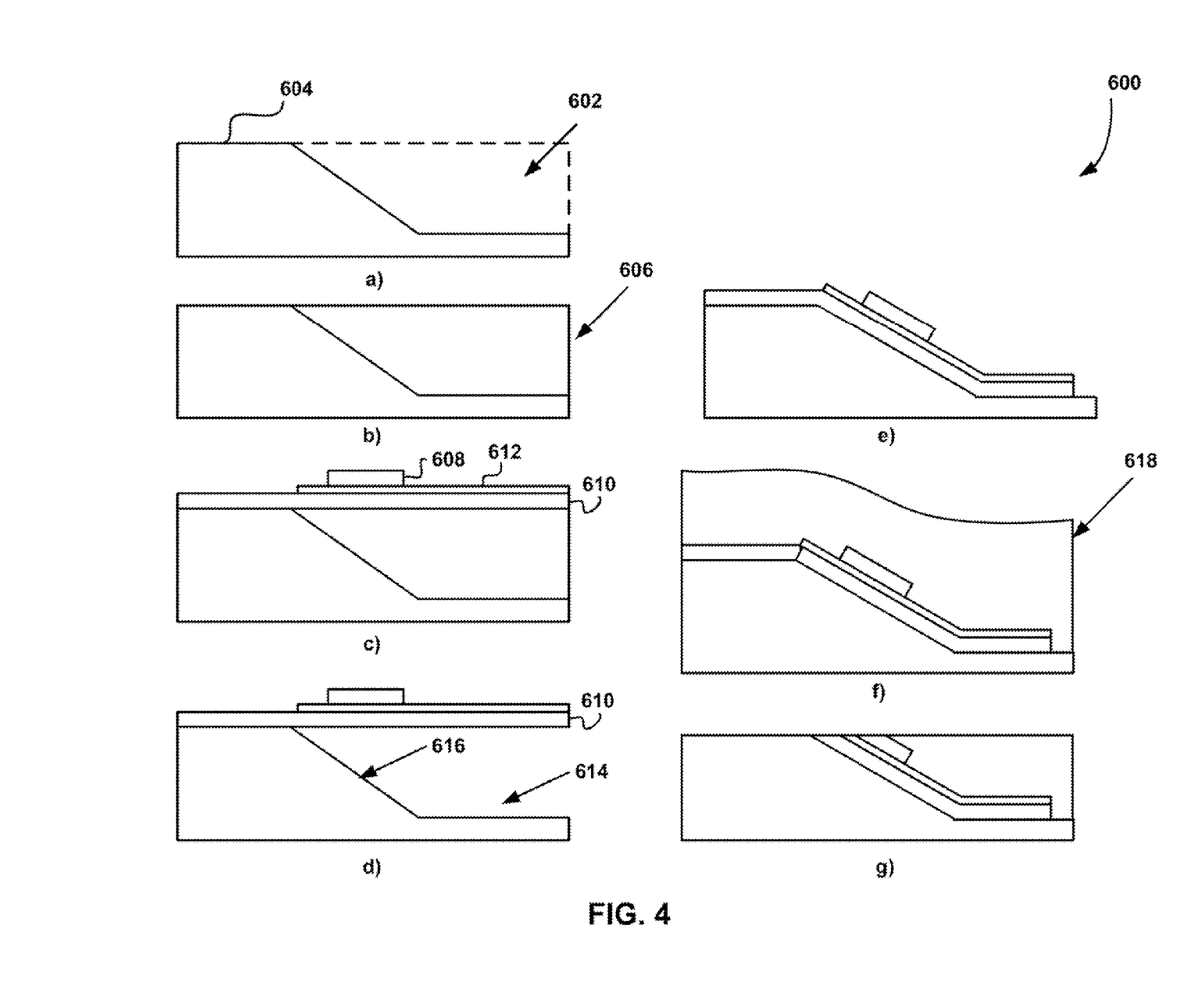
FIG. 4 shows a method for fabricating a magnetic transducer using post-deposition tilting, in accordance with still another embodiment.

FIG. 4 shows a method 600 for fabricating a magnetic transducer using post-deposition tilting, in accordance with still another embodiment. As shown, a cavity 602 is etched into a wafer 604 (FIG. 4a) and then filled with a temporary filling material 606 (FIG. 4b). A structure such as a sensor 608 is then deposited onto a membrane layer 610 (FIG. 4c). Such layer 610 may include any layer such as a nitride layer, a polymer layer, etc. Additionally, connecting lines 612 (e.g. leads) may be deposited.

Next, the temporary filling material 606 is removed (FIG. 4d) to form a cavity 614 under the membrane layer 610 and creates a suspended membrane above a tilted surface 616. In one embodiment, the magnetic transducer may be dipped in a liquid such as water and, upon removal and drying, the capillary force will pull down the membrane layer 610. The membrane layer 610 then adheres to the cavity surface, creating a sensor with a tilt (FIG. 4e). Next, the cavity is filled in (FIG. 4f) with a filling material 618, e.g., alumina, polymer, etc., and polished to create a uniform surface (FIG. 4g). Connections to the sensor 608 may be placed at the bottom of the sensor 608 and accessed through the back of the wafer 604, or by bringing electrical traces to the waver edge via grooves in the substrate. This method has the additional advantage that the tilting and finishing process adds little additional stress to the sensor.

Figure 5:
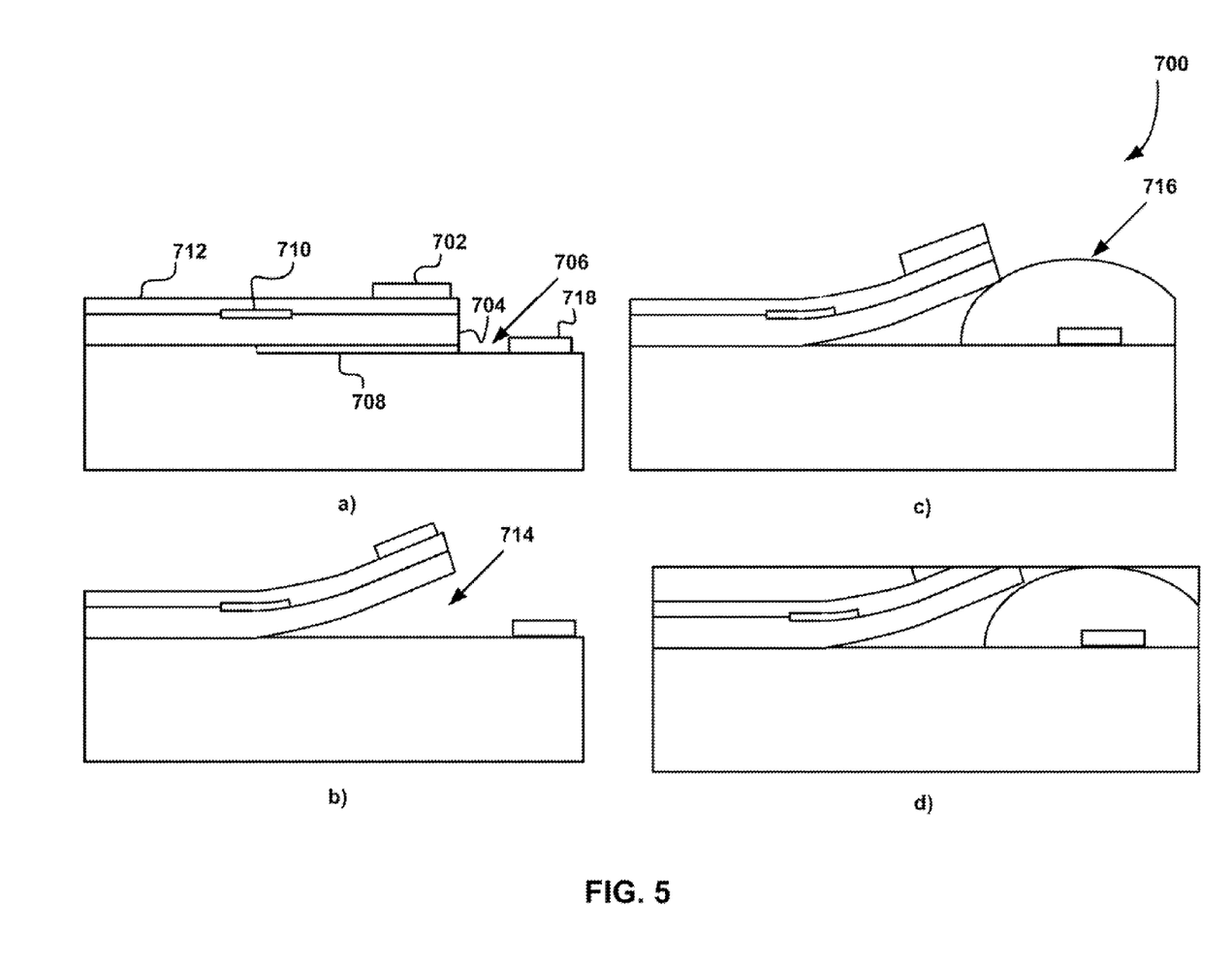
FIG. 5 shows a method for fabricating a magnetic transducer using post-deposition tilting, in accordance with yet another embodiment.

FIG. 5 shows a method 700 for fabricating a magnetic transducer using post-deposition tilting, in, accordance with yet another embodiment. As Shown, a locally stressed cantilever is utilized at the bending region to tilt a structure such as a sensor 702 out of a wafer plane. A film 704 (e.g. a nitride, a polymer, etc.) is deposited onto a wafer 706 with selected areas of a sacrificial layer 708. The film 704 is patterned into a cantilever.

The film 704 is locally stressed, using a suitable method such as a bimorph structure 710. The magnetic sensor 702 and leads 712 are then deposited onto the film 704 (FIG. 5a). Additionally, a conductor 718 may optionally be placed on the wafer 706. Next, the sacrificial layer 708 is removed, releasing the locally stressed cantilever, which bends upward (FIG. 5b). The area 714 surrounding the cantilever is then filled in, possibly by a plating metal 716 onto the conductor 718 (FIG. 5c), or other filling material such as polymer. Finally, the structure is filled and polished to make a uniform surface (FIG. 5d).

It should be noted that, while FIGS. 5-7 have been described to include magnetic sensors, magnetic readers or any other transducer such as magnetic writers may also or alternatively be present in the thin film transducer structure. Additionally, any suitable material may be utilized as filling material, wafer material, membrane layers, and any other component material described for exemplary purposes. Further, it should be noted that the methods for developing planar heads as described above offer the possibility of fabrication of 2D arrays of elements, elimination of a row bar lapping step, finishing at the wafer level, and wafer level deposition of overcoats onto a mechanical surface. Any of these advantages allow development of a simpler and lower cost magnetic head, while providing more design freedom.

The foregoing teachings provide a way to fabricate planar recording heads. Moreover, the foregoing methodology allows one to fabricate matrix arrays of write and/or read transducers.

In addition, the planar head design may allow the use of silicon as a substrate. This allows the integration of electronics including write drivers or read preamplifiers on the wafer. In addition, silicon processing may provide yet another reduction in cost.

Furthermore, the tilted structures described above may allow the sensor to be deposited using a standard process. Also, the magnetic sensor may be tested before it is tilted. Additionally, as mentioned above, a large range of tilt angles relative to the initial plane of deposition are possible, including tilting the sensor to greater than about 10 degrees, greater than about 30 degrees, greater than about 45 degrees, greater than about 60 degrees, greater than about 80 degrees, and about 90 degrees.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    forming a thin film magnetic transducer structure on a substantially planar portion of a substrate such that a plane of deposition of the thin film magnetic transducer structure is substantially parallel to a plane of the substrate; and
    causing the thin film magnetic transducer structure to tilt at an angle relative to the plane of the substrate, wherein the thin film magnetic transducer structure is fixed at the angle after being tilted,
    wherein the thin film transducer structure is a magnetic writer.

2. The method as recited in claim 1, wherein the thin film magnetic transducer structure is tilted such that the plane of deposition thereof is oriented at an angle of greater than about 1 degree from the plane of the substrate.

3. The method as recited in claim 1, wherein the substrate comprises silicon.

4. The method as recited in claim 1, further comprising planarizing the thin film magnetic transducer structure along a plane substantially parallel to the plane of the substrate.

5. The method as recited in claim 1, wherein the thin film magnetic transducer structure is formed on a rigid platform that tilts with the thin film magnetic transducer structure.

6. The method as recited in claim 1, wherein an axis of the tilting is about parallel to the plane of the substrate.

7. The method as recited in claim 1, wherein the thin film magnetic transducer structure is a magnetic sensor.

8. The method as recited in claim 1, and further comprising fixing the thin film magnetic transducer structure in place on the substrate at the angle after causing the thin film magnetic transducer structure to tilt.

9. A method, comprising:
    forming a thin film magnetic transducer structure on a substantially planar portion of a substrate such that a plane of deposition of the thin film magnetic transducer structure is substantially parallel to a plane of the substrate;
    causing the thin film magnetic transducer structure to tilt at an angle relative to the plane of the substrate, wherein the thin film magnetic transducer structure is fixed at the angle after being tilted; and
    removing a sacrificial portion of the substrate for causing the thin film magnetic transducer structure to pivot.

10. The method as recited in claim 9, wherein a point of pivoting of the thin film magnetic transducer structure is under and off-center from the thin film magnetic transducer structure.

11. The method as recited in claim 9, wherein removing the sacrificial portion of the substrate causes another portion of the substrate to form a cantilever supporting the thin film magnetic transducer structure, wherein a local stress operatively causes the cantilever to bend, thereby causing the thin film magnetic transducer structure to tilt at the angle.

12. The method as recited in claim 9, wherein removing the portion of the substrate allows built-in stresses to cause the thin film magnetic transducer structure to tilt at the angle.

13. A method, comprising:
    forming a thin film magnetic transducer structure on a substantially planar portion of a substrate such that a plane of deposition of the thin film magnetic transducer structure is substantially parallel to a plane of the substrate; and
    causing the thin film magnetic transducer structure to tilt at an angle relative to the plane of the substrate, wherein the thin film magnetic transducer structure is fixed at the angle after being tilted,
    wherein capillary action operatively causes the thin film magnetic transducer structure to tilt at the angle.

14. A method, comprising:
    forming a thin film magnetic transducer structure on a substantially planar portion of a substrate such that a plane of deposition of the thin film transducer structure is substantially parallel to a plane of the substrate; and
    removing a sacrificial portion of the substrate for causing the thin film transducer structure to tilt at an angle relative to the plane of the substrate.

15. The method as recited in claim 14, further comprising, after causing the thin film magnetic transducer structure to tilt, fixing the thin film magnetic transducer structure in place at the angle.

16. The method as recited in claim 14, wherein the thin film magnetic transducer structure is a magnetic sensor.

* * * * *